US011982427B2

(12) United States Patent
Meyer et al.

(10) Patent No.: US 11,982,427 B2
(45) **Date of Patent: *May 14, 2024**

(54) SIGN BOX LIGHT MODULE

(71) Applicant: THE SLOAN COMPANY, INC., Ventura, CA (US)

(72) Inventors: Aaron Meyer, Ojai, CA (US); Bruce Quaal, Ventura, CA (US)

(73) Assignee: The Sloan Company, Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,078

(22) Filed: Feb. 23, 2021

(65) Prior Publication Data

US 2021/0199270 A1 Jul. 1, 2021

Related U.S. Application Data

(63) Continuation of application No. 16/163,440, filed on Oct. 17, 2018, now Pat. No. 11,280,479.

(Continued)

(51) Int. Cl.
*F21V 19/00* (2006.01)
*F21S 4/10* (2016.01)

(Continued)

(52) U.S. Cl.
CPC .............. *F21V 19/003* (2013.01); *F21S 4/10* (2016.01); *F21V 23/001* (2013.01); *G09F 13/00* (2013.01);

(Continued)

(58) Field of Classification Search
CPC .............. F21Y 2107/90; F21Y 2115/10; F21V 19/003; F21S 4/10; G09F 13/00; G09F 13/04

See application file for complete search history.

(56) References Cited

U.S. PATENT DOCUMENTS 4,223,377 A * 9/1980 Williams ................ F21S 2/005 362/145
5,835,319 A 11/1998 Welles, II (Continued)

OTHER PUBLICATIONS

Office Action dated Dec. 22, 2020 for U.S. Appl. No. 16/163,440 (pp. 1-14) .

(Continued)

*Primary Examiner* — Tracie Y Green
*Assistant Examiner* — Michael Chiang
(74) *Attorney, Agent, or Firm* — Jaye G. Heybl

(57) ABSTRACT

The disclosure relates to light modules using light emitting diodes (LEDs) and more particularly to LED based light modules for existing sign boxes. One embodiment of a light module according to the present invention can comprise an elongated support structure having a plurality of surfaces and comprising a plurality of support structures joined together to form an overall support structure of a desired length. A plurality of light units can be included wherein at least some of the lighting units comprise a first light unit array on one of the support structure surfaces, and others of the said light units comprise a second light unit array on another one of the support structure surfaces. Conductors are arranged to connect the first light array in a series interconnection and to connect the second light array in a respective series interconnection.

20 Claims, 6 Drawing Sheets

Related U.S. Application Data

(60) Provisional application No. 62/574,090, filed on Oct. 18, 2017.

(51) Int. Cl.

| | |
|---|---|
| ***F21V 23/00*** | (2015.01) |
| ***G09F 13/00*** | (2006.01) |
| *F21Y 103/10* | (2016.01) |
| *F21Y 107/90* | (2016.01) |
| *F21Y 115/10* | (2016.01) |
| *G09F 13/04* | (2006.01) |
| *G09F 13/22* | (2006.01) |

(52) U.S. Cl.
CPC ....... *F21Y 2103/10* (2016.08); *F21Y 2107/90* (2016.08); *F21Y 2115/10* (2016.08); *G09F 13/04* (2013.01); *G09F 2013/222* (2013.01)

(56) References Cited

U.S. PATENT DOCUMENTS

| | | | | |
|---|---|---|---|---|
| 6,042,248 | A * | 3/2000 | Hannah | G09F 13/0404 362/249.14 |
| 6,283,612 | B1 | 9/2001 | Hunter | |
| 6,670,626 | B2 * | 12/2003 | Witham | A61L 2/10 250/504 R |
| 7,441,922 | B2 | 10/2008 | Huang | |
| 7,490,957 | B2 | 2/2009 | Leong | |
| 7,674,016 | B2 | 3/2010 | Zhang | |
| 9,404,645 | B1 | 8/2016 | Feng | |
| 9,470,385 | B1 | 10/2016 | Ploucher | |
| 10,039,178 | B2 | 7/2018 | Liu | |
| 10,738,948 | B2 * | 8/2020 | Li | F21S 2/005 |
| 2005/0017732 | A1 | 1/2005 | Kim | |
| 2006/0049368 | A1 * | 3/2006 | Culbert | A61L 9/20 250/503.1 |
| 2009/0073693 | A1 | 3/2009 | Nall | |
| 2012/0008315 | A1 * | 1/2012 | Simon | F21K 9/272 362/217.13 |
| 2012/0092875 | A1 * | 4/2012 | Cho | F21S 2/005 362/311.01 |
| 2012/0206910 | A1 | 8/2012 | Watson | |
| 2013/0063944 | A1 * | 3/2013 | Lodhie | F21K 9/278 362/249.02 |
| 2013/0265746 | A1 | 10/2013 | May | |
| 2014/0085881 | A1 | 3/2014 | Clifford | |
| 2015/0184807 | A1 * | 7/2015 | Vincent | F21K 9/90 362/223 |
| 2015/0260389 | A1 | 9/2015 | Caron | |
| 2015/0308631 | A1 * | 10/2015 | Gorman | F21V 15/013 362/221 |
| 2015/0345755 | A1 * | 12/2015 | Purdy | F21V 17/16 362/219 |
| 2016/0369950 | A1 | 12/2016 | Yeager | |
| 2017/0074474 | A1 * | 3/2017 | Bailey | F21V 3/00 |
| 2017/0280521 | A1 | 9/2017 | Shan | |
| 2020/0144230 | A1 | 5/2020 | Lin | |

OTHER PUBLICATIONS

Office Action dated May 24, 2021 for U.S. Appl. No. 16/163,440 (pp. 1-14).

Office Action (Notice of Allowance and Fees Due (PTOL-85) dated Nov. 19, 2021 for U.S. Appl. No. 16/163,440 (pp. 1-8).

Office Action (Non-Final Rejection) dated Jul. 22, 2022 for U.S. Appl. No. 17/138,481 (pp. 1-6).

* cited by examiner

SIGN BOX LIGHT MODULE

This application is a continuation of and claims the benefit of U.S. patent application Ser. No. 16/163,440, which claims the benefit of U.S. Provisional Patent Application Ser. No. 62/574,090, filed on Oct. 18, 2017.

BACKGROUND OF THE INVENTION

Field of the Invention

This disclosure relates to light modules using light emitting diodes (LEDs) and more particularly to LED based light modules for illuminating sign boxes.

Description of the Related Art

Display units, such as sign boxes, cabinet signs, and light boxes are commonly found on the outside of buildings or businesses and are often used to advertise the name of the business or products. Typical units are constructed of aluminum or plastic housing having the shape of a box and can be approximately 5" deep. The housing sometimes has a swing open frame to allow for easily changing the advertising graphics within. The top opening in the housing, or surface, is covered by a translucent or clear lens that transmits light from within the housing. The advertisement graphic is placed under this lens so that it is between the lens and the lighting units inside the light box. This allows the graphic to be illuminated from behind by the lighting units within the sign box. In some cases, the translucent lens itself may be the illuminated graphic.

Some sign boxes or cabinets have graphics on one side and light only illuminates that side, whereas others can be double-faced such that the two opposite sides of the sign box each have a translucent or clear lens with a graphic and lighting inside the sign box or cabinet which illuminates both these sides and graphics.

To enhance the visibility of the advertisement within these units, different types of lighting are incorporated. Various types of lighting systems are used with different light sources such as incandescent bulbs, neon bulbs or fluorescent tubes. One of the problems associated with the conventional lighting units and systems is that their light sources can experience relatively short lifespans and they can have relatively low electrical efficiency. Incandescent bulbs, neon bulbs and fluorescent tubes have a relatively short lifespan, particularly when compared to other light sources, such as typical LEDs. These light sources are also electrically inefficient and providing sufficient lighting, especially in large lighting applications, requires the consumption of significant energy. For example, a standard fluorescent tube 60 inches in length consumes as much as 60 to 70 Watts, and conventional display units can utilize many of these tubes. Neon bulbs can also experience difficulty with cold starting, which can lead to failure of the neon bulb.

More recently, with the advent of the efficient solid-state lighting sources, these display units have been used with LEDs, for example. LEDs are solid state devices that convert electric energy to light and generally comprise one or more active regions of semiconductor material interposed between oppositely doped semiconductor layers. When a bias is applied across the doped layers, holes and electrons are injected into the active region where they recombine to generate light. Light is produced in the active region and emitted from surfaces of the LED.

LEDs have certain characteristics that make them desirable for many lighting applications that were previously the realm of incandescent or fluorescent lights. Incandescent lights are very energy-inefficient light sources with a vast majority of the electricity they consume being released as heat rather than light. Fluorescent light bulbs are more energy efficient than incandescent light bulbs, but are still relatively inefficient. LEDs by contrast, can emit the same luminous flux as incandescent and fluorescent lights using a fraction of the energy.

In addition, LEDs can have a significantly longer operational lifetime. Incandescent light bulbs have relatively short lifetimes, with some having a lifetime in the range of about 750-1,000 hours. Fluorescent bulbs can also have lifetimes longer than incandescent bulbs such as in the range of approximately 10,000-20,000 hours, but provide less desirable color reproduction. In comparison, LEDs can have lifetimes between 50,000 and 70,000 hours.

The increased efficiency and extended lifetime of LEDs is attractive to many lighting suppliers and has resulted in LED lights being used in place of conventional lighting in different sign applications. However, some existing sign boxes may not be equipped to easily allow for installation of new LED based lights. As such, existing sign boxes may need to have portions of the existing lighting fixtures removed or disassembled to allow for new LED based lights to be installed. This may also require additional mounting fixtures to allow the new LED based lights to be installed within existing sign boxes, which can result in increased costs for replacing existing lighting units with LED based lights and could be cost prohibitive.

SUMMARY

The disclosure relates to light modules using light emitting diodes (LEDs) and more particularly to LED based light modules for existing sign boxes. In the embodiments described herein, light modules and mechanical mounting methods and devices are provided that allow for quick, easy, and reliable mounting of LED light modules within existing sign boxes. This arrangement can allow for mounting light modules while utilizing existing fixtures within the existing sign boxes, without the need for removing all existing fixtures and/or structures and installing new mount mechanisms in order to mount the LED light modules within the existing sign box.

One embodiment of a light module according to the present invention can comprise an elongated support structure having a plurality of surfaces. A plurality of light units can be included wherein at least some of the lighting units comprise a first light unit array on one of the support structure surfaces, and others of the said light units comprise a second light unit array on another one of the support structure surfaces. Conductors are arranged to connect the first light array in a series interconnection and to connect the second light array in a respective series interconnection.

A better understanding of the features and advantages of the disclosure will be obtained by reference to the following description of the disclosure and accompanying drawings which set forth illustrative embodiments in which the principles of the disclosure are utilized.

DETAILED DESCRIPTION

Figure 1:
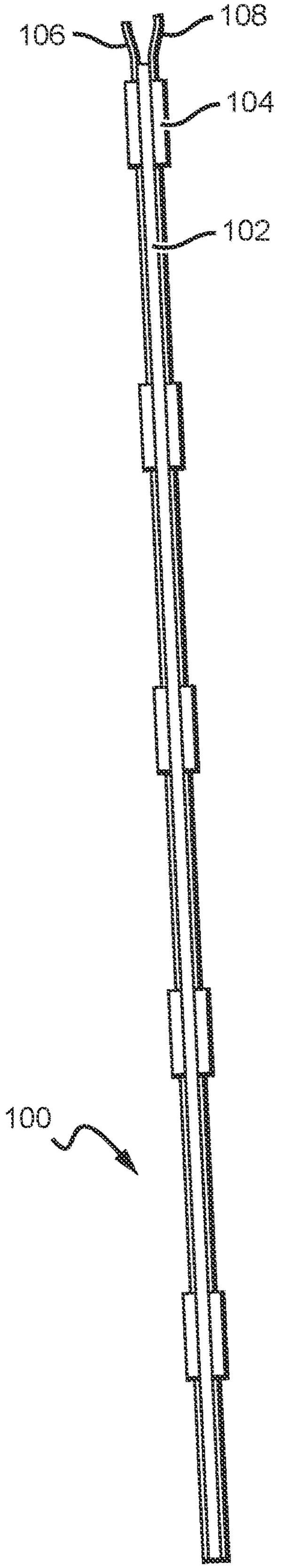
FIG. 1 is a perspective view of a light module according to one embodiment of the present invention.

The disclosure provides light modules for lighting systems that can be used in many different applications but is particularly applicable to sign boxes commonly found on the outside of buildings or businesses and often used to advertise the name of the business or products. In some embodiments the light modules comprise a light source mounted onto a support structure wherein the light module can be mounted within a sign box and is arranged for quick, easy, and reliable mounting within the sign box. In other embodiments the light module can be received by existing mounting structures within the sign box in order to mount the light module within the sign box without the need to install new mounting structures for the light module. Different arrangements according to the disclosure can be used for retrofitting existing sign boxes while others can be used with newly constructed sign boxes. The light modules are arranged to be used with existing mounting mechanism previously installed within a sign box and with future mounting mechanisms.

The disclosure is described herein with reference to certain embodiments, but it is understood that the disclosure can be arranged in many different configurations and is not intended to be limited to the embodiments disclosed herein. In some embodiments, the light module can be configured to comprise an elongated support structure, but it is understood that the length of the support structure can be various lengths. The light module can have one or more light sources mounted onto the support structure. In some embodiments the light sources are mounted on the same surface of the support structure, while in other embodiments the light sources can be mounted on more than one surface of the support structure. In addition, the light sources can have many different types of emitters, such as but not limited to light emitting diodes (LED or LEDs). The different embodiments can comprise different numbers of LEDs and/or can have LEDs emitting different colors or light, such as but not limited to white light.

It is to be understood that when an element such as a layer, region or substrate is referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one layer or another region. It is understood that these terms are intended to encompass different orientations of the device in addition to the orientation depicted in the figures.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure.

embodiments of the disclosure are described herein with reference to illustrations that are schematic illustrations. As such, the actual thickness of elements can be different, and variations from the shapes of the illustrations as a result, for example, of manufacturing techniques and/or tolerances are expected. embodiments of the disclosure should not be construed as limited to the particular shapes of the regions illustrated herein but are to include deviations in shapes that result, for example, from manufacturing. A region illustrated or described as square or rectangle will typically have rounded or curved features due to normal manufacturing tolerances. Thus, the elements/regions illustrated in the figures are schematic in nature and their shapes are not intended to illustrate the precise shape of a feature of a device and are not intended to limit the scope of the disclosure.

The description set forth herein, in connection with the appended drawings, is intended as a description of various configurations and is not intended to represent the only configurations in which the concepts described herein may be practiced. The description includes specific details for the purpose of providing an understanding of the various concepts. It will be apparent to those skilled in the art, however, that these concepts may be practiced without these specific details. As described herein, the use of the term "and/or" is intended to represent an "inclusive OR", and the use of the term "or" is intended to represent an "exclusive OR".

FIGS. 1-5 show an embodiment of a light module 100 according to the disclosure. The light module 100 comprises a support structure 102, at least one light unit 104 mounted on the support structure 102. In the embodiment shown, that at least one light unit 104 comprises a plurality of light units 104, with an equal number of light units 104 on opposite surfaces on the structure 102 and arranged to emit light away from the structure 102.

First and second conductors 106, 108 are arranged to electrically connect the plurality of light units 104 such that the light units 104 emit light in response to an electrical signal. The conductors 106, 108 conduct electricity to the light units 104 and an electrical signal applied to the conductors is conducted to each of the light units 104 so that at least one light unit emits light. The light units 104 are arranged such that, when installed in a sign box and illuminated, give the appearance that a sign box, which the light module is installed within has a continuous light source.

In the embodiment of FIGS. 1-5, the light module 100 comprises a plurality of light units 104 mounted on a support structure 102, wherein each of the plurality of light units 104 is electrically connected by the first and second conductors 106, 108. The light module 100 comprises a plurality of light units mounted on a first surface 110 of the support structure 102, and further comprises a plurality of light units mounted on a second surface 112 of the support structure 102. In some embodiments, the first and second surfaces 110, 112 of the support structure 102 can be opposite surfaces from each other. However, in other embodiments the first and second surfaces 110, 112 do not have to be opposite each other and can be adjacent each other, such that the first surface is arranged to be substantially perpendicular to the second surface. In still other embodiments, the first and second surfaces 110, 112 can be arranged at many different angles with respect to each other, such as but not limited to, 0-180 degrees. The arrangement of the first and second surfaces 110, 112 can be arranged based on the configuration of the support structure 102.

The support structure 102 can comprise an elongated support structure designed to receive a plurality of light units on one or more surfaces. In the embodiments of FIGS. 1-5, the light units 104 are on a first surface 110 and a second surface 112 of the elongated support structure 102. The support structure 102 can comprise many different shapes, such as but not limited to square, rectangular, quadrilateral, or any polygonal shape. In some embodiments, the support structure can comprise an extrusion profile of many of the various shapes discussed above. The support structure 102 can comprise many different materials, such as but not limited to aluminum, steel, plastic, fiberglass, carbon fiber, or the like, and/or a combination thereof.

In the embodiments of FIGS. 1-5, the support structure comprises a square extrusion profile, such that the first and second surfaces that receive the plurality of light units are opposite each other. In some embodiments, the support structure can comprise a ⅜"×⅜" extrusion profile, but can be arranged to comprise extrusion profiles of various dimensions and is not intended to be limited to ⅜"×⅜". In other embodiments, the support structure can comprise an extrusion profile less than and/or greater than ⅜"×⅜". At least one advantage of the support structure having a ⅜"×⅜" extrusion profile is that such profile fits naturally into existing lamp sockets of existing sign boxes populated with T12 HO fluorescent tubes. As such, it becomes an easy retrofit to remove the existing fluorescent tubes and replace them with the light modules 100. The light modules will be securely held within the existing sockets without the need to install new and/or replacement mounting mechanisms, which eases installation and can reduce costs.

In some instances, the existing sign box may comprise existing lamp sockets other than T12 sockets. In such an occurrence, the support structure 102 can be configured to receive end caps on the opposing ends of the support structure, wherein the end caps are configured to engage with the existing socket. In some embodiments, the end caps can be configured to engage a bi-pin type socket that is commonly used with conventional T8 light bulbs. The end caps are received by the existing socket and assist to securely mount the light module within the existing sockets without the need to install new and/or replacement mounting mechanisms, which also eases installation and can reduce costs, as discussed above. The end cap can be arranged to engage many different light sockets known in the art, and is not intended to be limited to engaging bi-pin type sockets.

In some embodiments, the support structure 102 can be comprised of a plurality of support structures 102 that are joined together to form the desired overall length of the support structure 102. The plurality of support structures 102 can be arranged in many different configurations to allow for the plurality of support structures to be attached to each other. In other embodiments, a first support structure comprises outer dimensions slightly smaller than the inner dimensions of a second support structure, wherein the first support structure is inserted into the second support structure in order to attach the first and second support structures together. Additional attachment mechanisms can be used to attach the first and second support portions, such as but not limited to set screws. In other embodiments, the first and/or second support structure can be tapered such that a compression force is exerted onto the first and/or second support structures when the first support structure is inserted into the second support structure, such that at least the compression force fastens the first and second support structures together.

In the embodiment shown in FIGS. 1-5, support structure 102 is extruded to form a single continuous support structure that is set at the desired length. The support structure 102 can comprise various lengths and such as in the range of 18" to 120". It is understood, however, that the structure 102 can have other lengths. In each instance, the support structure 102 can be comprised of a single piece of extruded material. At least one advantage of the support structure being comprised of a single piece of extruded material is that the light module can be fabricated off-site prior to being installed based on the required length of the support structure which can ease the installation process as well as reduce the time needed to install the light module. Furthermore, the wiring of the light module can be pre-assembled such that the light module can be easily connected to the power supply after being installed within the sign box.

Figure 2:
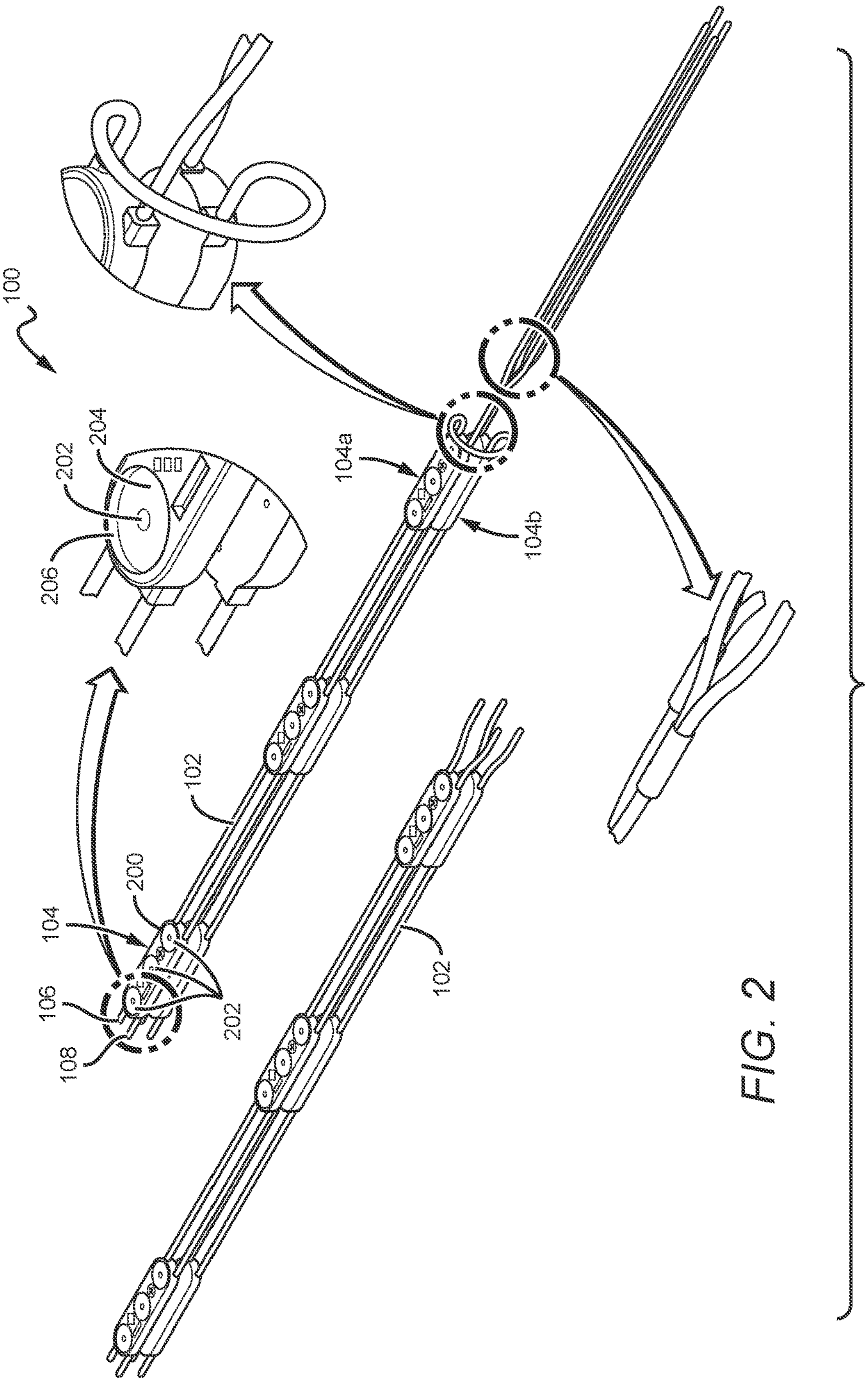
FIG. 2 is a perspective view of light units according to one embodiment of the present invention.
Figure 3:
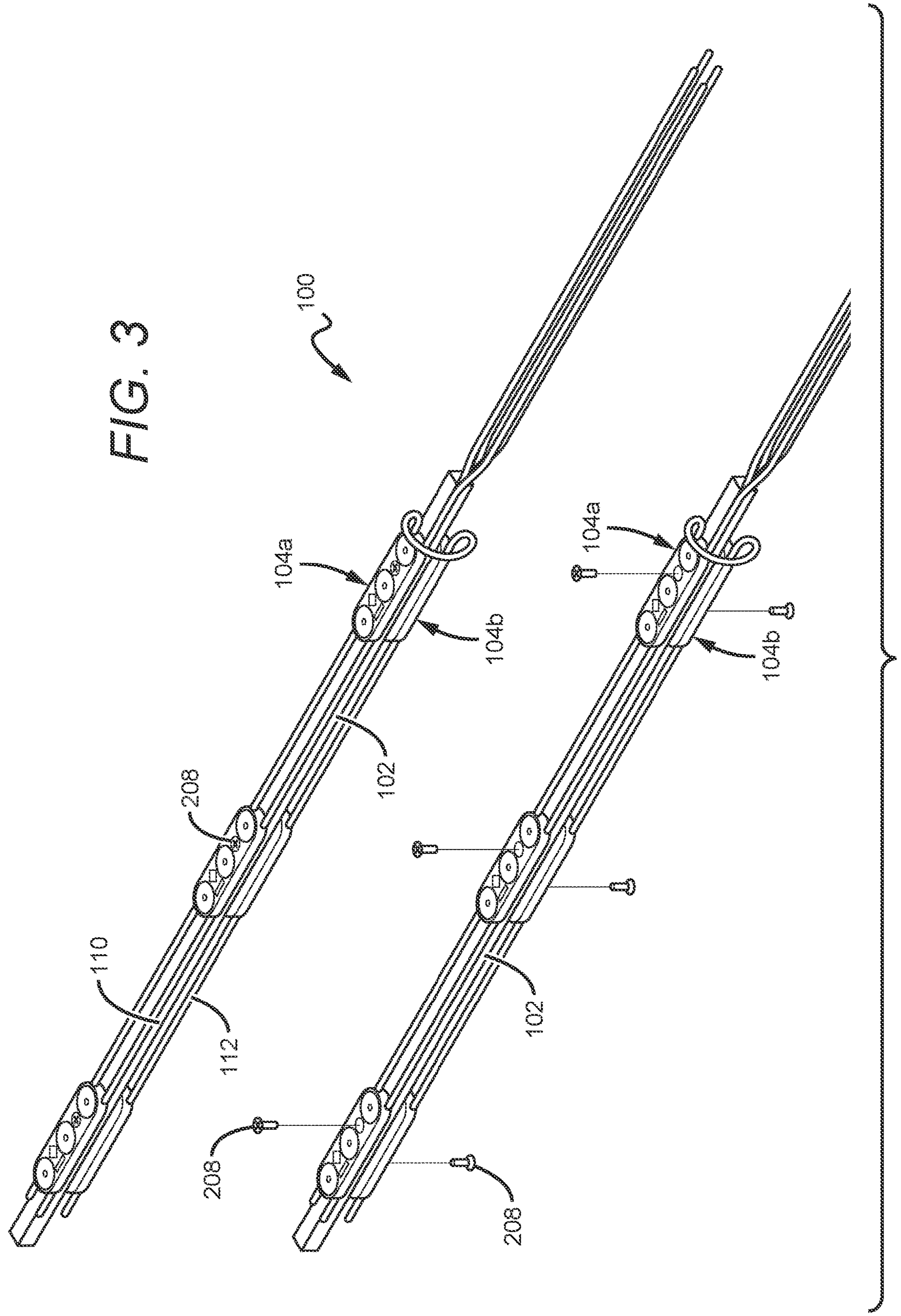
FIG. 3 is a perspective view of the light module according to one embodiment of the present invention.

The light module 100 can comprise a plurality of light units 104 mounted on the support structure 102, as shown in FIGS. 2 and 3. The plurality of light units 104 can be daisy-chained together by the first and second conductors 106, 108. Each of the light units 104 can comprise one or more light elements that emit light out from the light unit 104 in response to an electrical signal. The electrical conductors 106, 108 conduct electricity to each of the light units 104 such that each of the light units 104 simultaneously emit light. The light units 104 are adapted to be mounted on the support structure 102, such as by tape, adhesives, screws or clamps. In some embodiments, the light units 104 can be mounted onto the support structure using fasteners 208, such as but not limited to screws, double-sided tape, and/or a combination thereof. The light units 104 can be mounted onto the support structure using many different mounting devices and is not intended to be limited to the embodiments disclosed herein.

The light units 104 can comprise a housing 200 and one or more light elements 202 mounted on a printed circuit board (PCB), wherein the one or more light elements 202 and PCB are within the housing 200. The light units can further comprise an optical element 204 proximate the one or more light elements 202, and a lens 206 covering the one or more light elements 202. In some embodiments the optical element 204 can be arranged to reflect the light emitted from the light element 202. In other embodiments, the optical element 204 can be arranged to redirect the light emitted from the light element such that the light emitted from the light unit is emitted in a desired light distribution pattern. The lens 206 can also be arranged to redirect light in a desired light distribution pattern. In some embodiments, the lens 206 can be configured to diffuse the light emitted from the light element.

With reference to FIGS. 2 and 3, the light module 100 is a double-sided light module wherein the light units 104 are on opposing surfaces of the support structure. The double-sided light module comprises a first array of light units **104*a* on a first surface of the support structure, and a second array of light units 104*b* on a second surface of the support structure opposite the first surface. Each of the first and second array of light units are daisy-chained, respectively. Each of the first and second array of light units 104*a*,104*b* comprise the same number of light units 104. However, in some embodiments, the first and/or second array 104*a*,104*b*** can have the same and/or different number of light units.

Figure 5:
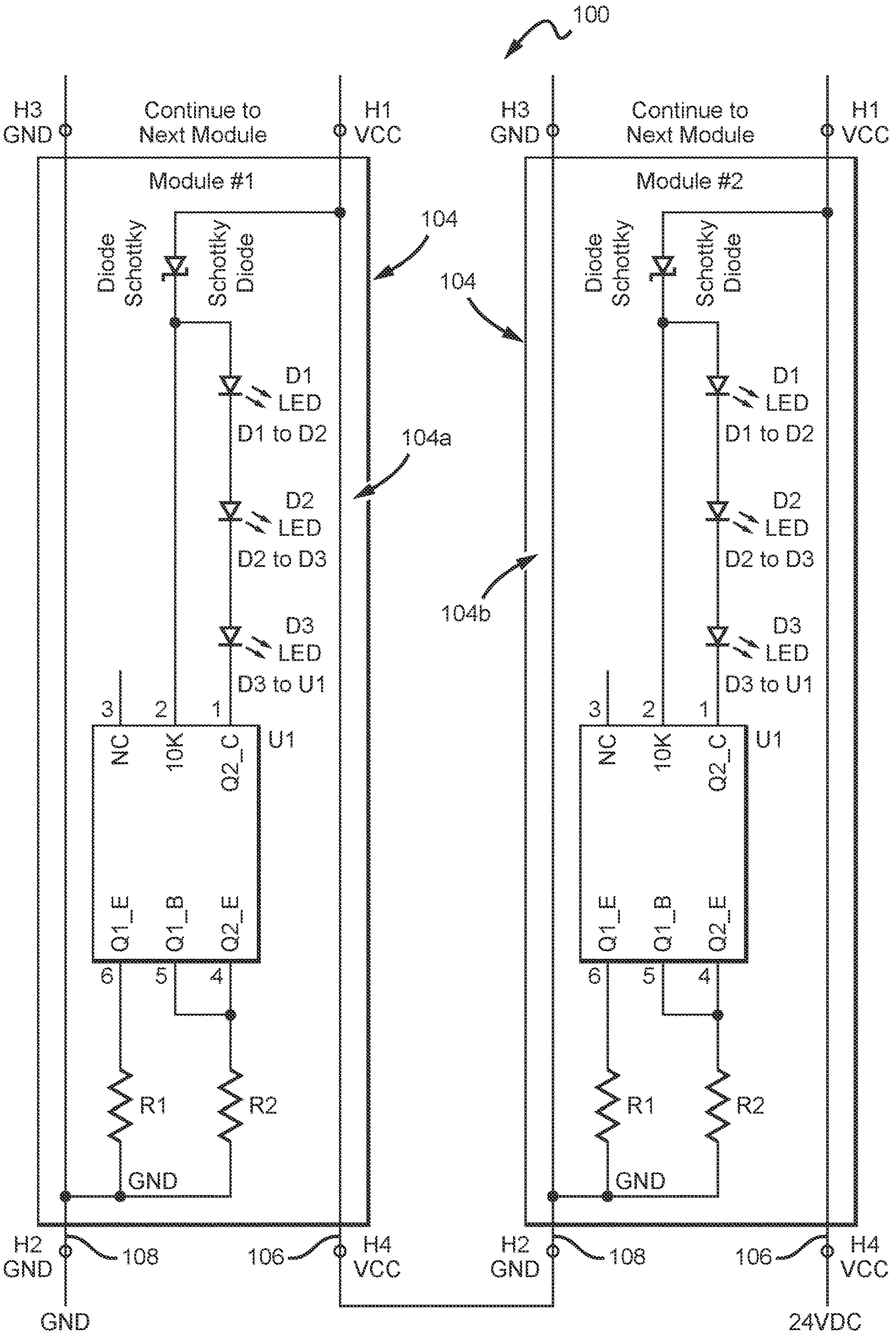
FIG. 5 is a partial wiring schematic of the light module according to one embodiment of the present invention.

The first and second arrays 104*a*,104*b* are joined together at a respective end of the arrays to form the double-sided light module. The ends of the arrays 104*a*,104*b* can be proximate the same end of the support structure 102. For example, the wiring scheme of the first and second arrays 104*a*,104*b* can be arranged such that the first conductor 106 of the first array 104*a* and the second conductor 108 of the second array 104*b* are connected together, as shown in FIGS. 2, 3, and 5. The second conductor 108 of the first array 104*a* and the first conductor 106 of the second array 104*b* are separated and are configured to be connected to the power supply and/or another light module. As a result, the first and second arrays 104*a*,104*b* are wired in respective series connection.

At least one advantage of the first and second arrays being wired in series is that the light module 100 can be a double-sided light module while remaining within the Class 2 wiring guidelines of Class 2 circuits. In general, a Class 2 circuit can operate with a 24V power supply, have a maximum current of 5 Amps, and have a maximum power of 100 Watts. Conventional arrays of light units utilize a 12V power supply with a maximum power of 60 Watts. The wiring scheme of the first and second arrays of the light module adheres to the Class 2 circuit requirements, which allows for the use of a 24V power supply with a maximum power of 100 Watts. The wiring scheme of the disclosure allows for an increase in power over that of conventional arrays, which in turn allows for more light modules to be connected to a power supply than that of conventional arrays. For example, a single 12V power supply can only be connected to one double-sided conventional array that is 8 feet in length, due to the Class 2 circuit requirements. Conventional double-sided arrays are essentially a single array folded in half at a desired point to form the double-sided array, without altering the wiring of the array. As such an 8-foot doubled-sided array is formed by bending a 16-foot array of light units in half to form two 8-foot arrays.

The wiring scheme disclosed herein allows for a 24V power supply to be connected to two double-sided light modules 100 that are 8 feet in length. As such, the wiring scheme disclosed herein allows for more light modules 100 to be connected to a single power supply than that of conventional arrays. This improvement reduces overall costs of installation, because less power supplies would be needed to provide power to the light modules 100, which in turn reduces material costs. The above example is a non-limiting example of the improvements provided by the disclosure, and the disclosure is not intended to be limited to the example discussed above. The disclosure in essence provides the advantage of at least doubling the number of light modules 100 that can operate on a single power supply.

Figure 4:
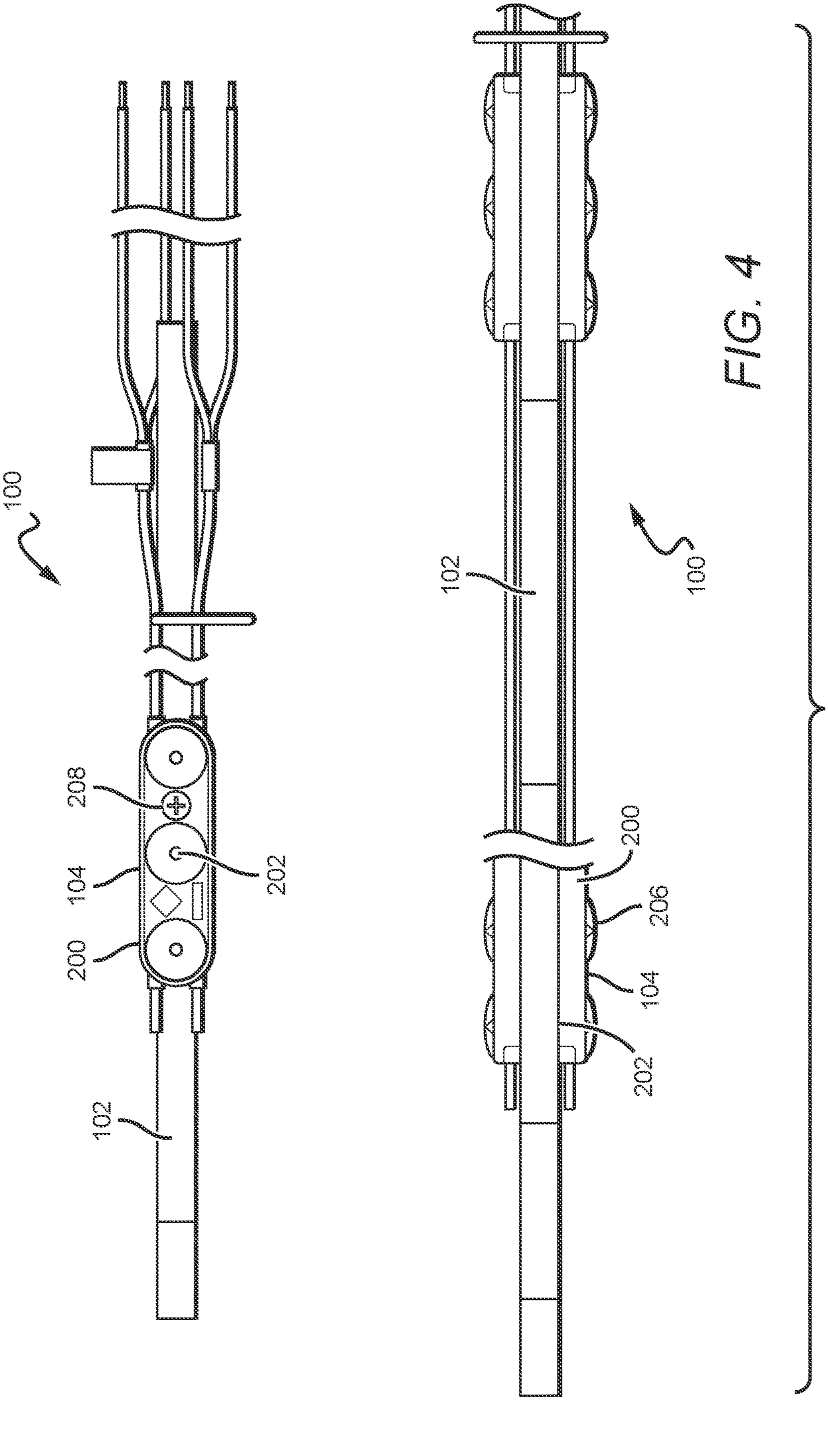
FIG. 4 is a side view of the light module according to one embodiment of the present invention.

FIG. 4 shows two side profile views of the light module 100, and shows that the support structure 102 extends beyond the first and last of the light units 104. The extended portion of the support structure 102 is configured to be received by an existing light socket within the existing sign box. The extended portion separates the light units 104 from the existing light socket, such that the light emitted from the light units is not interfered by the existing light socket.

In some embodiments, the light module 100 can be installed in a new construction sign box and/or in a sign box that does not have an existing light socket and/or the existing light socket is damaged and needs to be removed. In such embodiments, the sign box may not comprise a viable light socket to receive the light module. As such, mount brackets are used to mount the light module 100 to the sign box. The mount brackets can be arranged in many different configurations to receive the light module. In other embodiments, the mount bracket can be L-shaped wherein the mount bracket is mounted within the sign box and the extended portion of the support structure of the light module is mounted to the mount bracket. The mount brackets can be arranged in many different configurations and are not intended to be limited to the embodiments disclosed herein.

Figure 6:
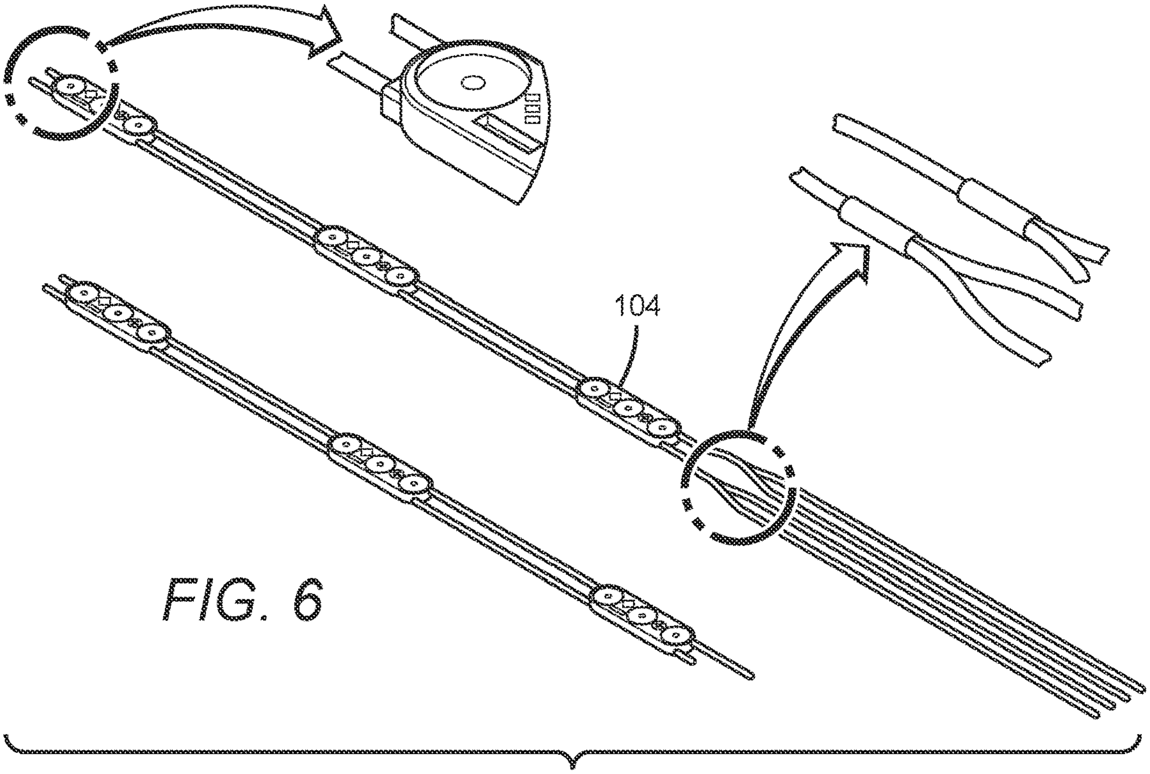
FIG. 6 is a perspective view of light units according to another embodiment of the present invention.
Figure 7:
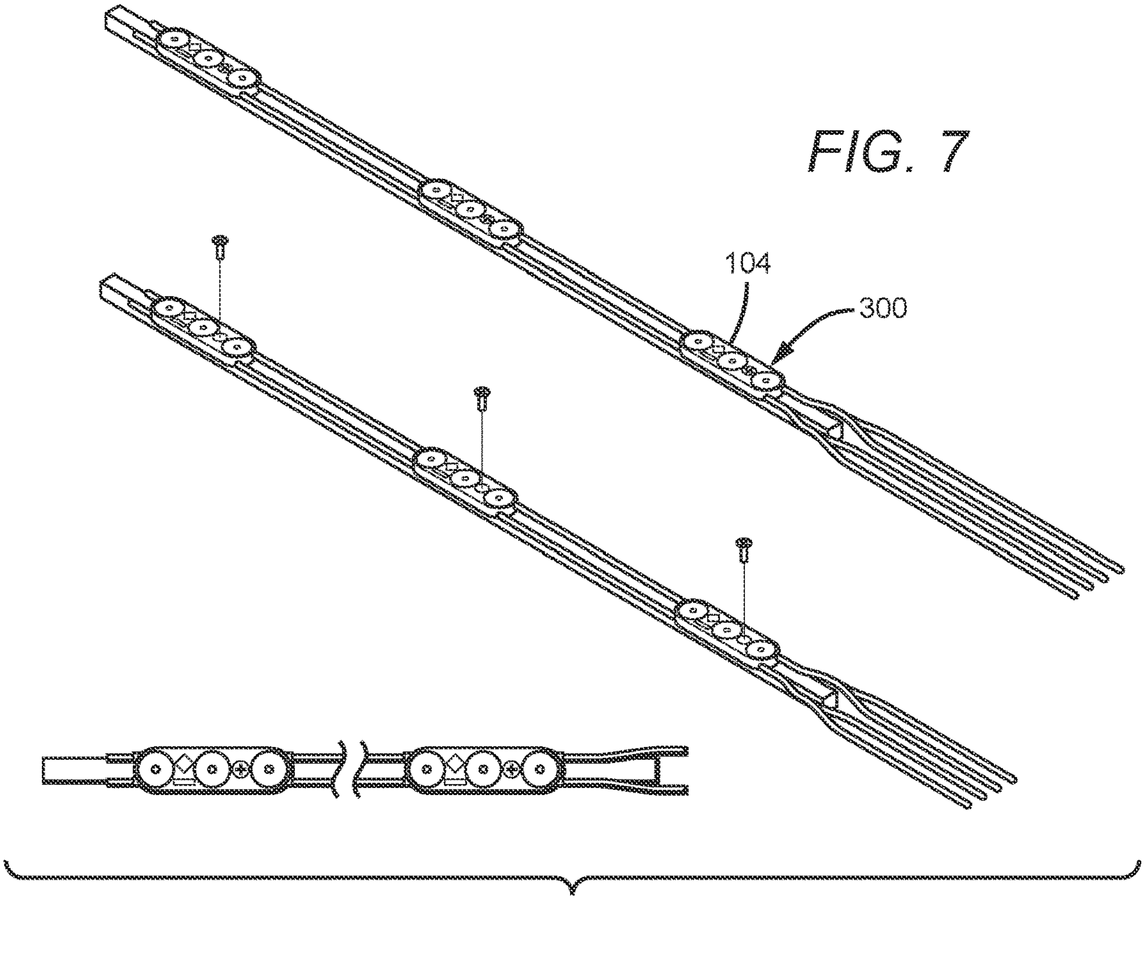
FIG. 7 is a perspective view of a light module according to another embodiment of the present invention.

The light module 100 of FIGS. 1-5 are shown as being a double sided light module. In some embodiments, as shown in FIGS. 6 and 7, the light module can be a single sided light module 300, such that an array of light units is mounted on only one surface of the support structure. The light module 300 can comprise some of the same features as the light module 100 and can be configured similar as the light module 100, with the exception that light module 300 is a single-sided light module. The single sided light module can be mounted to a sign box similarly as discussed above.

FIG. 5 shows a schematic for one embodiment of a lighting module 100, showing two light units 104 that would be on opposing surfaces of a support structure 102 as described above and shown in FIG. 104. Each of the light units 104 are the first light units in respective first and second light unit arrays 104*a*,104*b*. Each of the light units 104 connect to the next light unit in their respective array. As shown, each of the light units has two conductors 106, 108 for applying an electrical signal to the units to cause their LEDs to emit light. It is noted that one of the conductors is shared between the light units 104, with the other conductor in light unit 104 of array 104*b* being connected to 24 VDC and the other conductor in light unit 104 of array 104*a* connected to ground.

Figure 8:
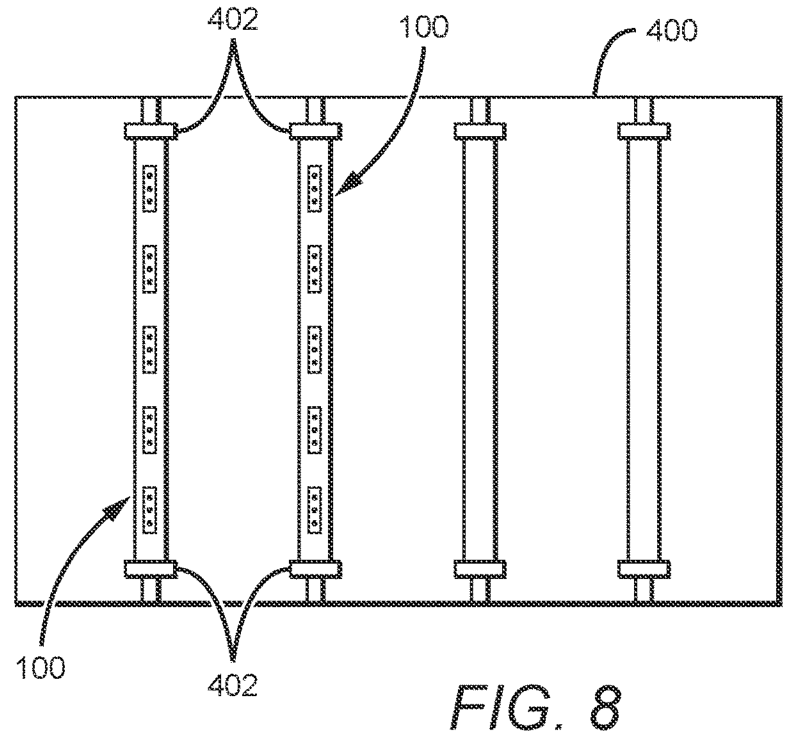
FIG. 8 is a perspective view of a light module according to one embodiment of the present invention.

FIG. 8 is a perspective view of the light module 100 mounted within an existing sign box 400 using the existing light sockets 402. The sign box of FIG. 8 is configured to hold four T12 HO fluorescent tubes, but is shown with two of the existing T12 HO fluorescent tubes removed and replaced by two light modules 100. The light modules 100 are easily received by the T12 light sockets due to the support structure 102 being sized to fit within the opening of the T12 light socket. The T12 light socket has an opening that allows for a ⅜"×⅜" square profile support structure to easily fit within the opening. As discussed above, the support structure of the light module can have any sized profile and is not intended to be limited to a ⅜"×⅜" square profile. In some embodiments, the support structure can comprise a triangular profile such that the support structure can be easily received within the existing light socket. In other embodiments, the support structure can comprise a quadrilateral, pentagonal, or any polygonal shape while yet still easily being received within the existing light socket. In yet still other embodiments, the extruded profile can be constant, while in other embodiment the extruded profile can be varied. The extended portions of the support structure that are received by the existing light socket can have a profile that is the same or different from the portion of the support structure that receives the array of light units.

Figure 9:
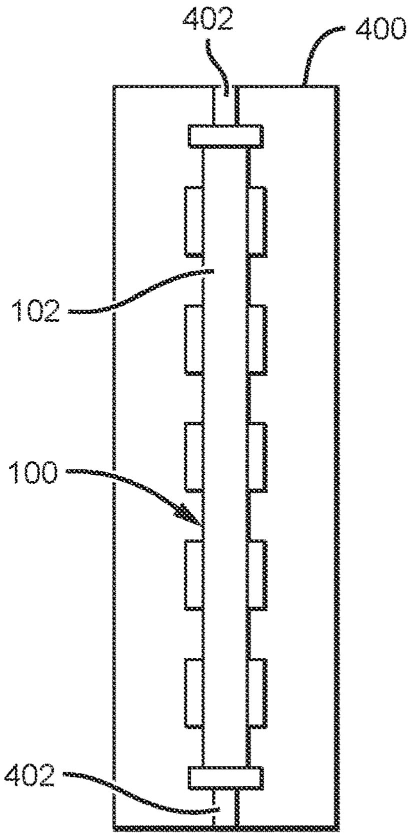
FIG. 9 is a side view of the light module shown in FIG. 8.

FIG. 9 is a side view of the light module 100 mounted within the existing sign box 400 of FIG. 8. As shown in FIG. 9, the support structure 102 is configured to be received within the existing light socket. At least one advantage is that the square profile of the support structure properly aligns the first and second arrays of light units towards the respective light transmissive faces of the sign box. The surfaces of the support structure can be arranged to align the first and/or second array of light units with the light transmissive face of the sign box. In some embodiments, the sign box may have an angled light transmissive face such that the face may be angled with respect to a square profile support structure. In such embodiments, the profile of the support structure could be shaped to correspond with the angled face(s) such that the array of light units can be properly aligned with the angled face(s).

Although the disclosure has been described in considerable detail with reference to certain configurations thereof, other versions are possible. Light modules according to the disclosure can be many different sizes and can be used for many different applications beyond sign boxes. The light units according to the disclosure can be arranged in many different configurations and can be arranged to emit different lighting effects. In some embodiments, the light units can be configured to emit the same and/or different color of lights. The light units can be configured to have the same and/or different light distribution pattern. In other embodiments, a variable power supply can be used to control the intensity of light emitted from the light units and/or light modules. Therefore, the spirit and scope of the disclosure should not be limited to the versions described above.

We claim:

1. A lighting module, comprising:

a plurality of support structures joined together to form an overall support structure of a desired length, wherein said overall support structure has a plurality of surfaces;

a plurality of light units, wherein at least some of said lighting units comprise a first light unit array on one of said support structure surfaces, and others of the said light units comprise a second light unit array on another one of said support structure surfaces; and a plurality of first conductors running along said elongated support structures and arranged to connect said first light unit array in a series interconnection and a plurality of second conductors to connect said second light unit array in a respective series interconnection, with only one of said first conductors from said first light unit array being connected to one of said second conductors of said second light unit array, wherein a second of said first conductors and a second of said second conductors are configured for connection to a power supply or another lighting module.

2. The lighting module of claim 1, wherein said plurality of support structures are joined together end-to-end.

3. The lighting module of claim 1, wherein said overall support structure has a length of conventional elongated T8 fluorescent light sources.

4. The lighting module of claim 1, wherein said plurality of support structures comprises first and second support structures wherein said first support structure has an outer dimension and said second support structure has an inner dimension, wherein said first support structure outer dimensions is slightly smaller than said second support structure inner dimension.

5. The lighting module of claim 1, wherein said plurality of support structures comprises first and second support structures, wherein said first support structure has a taper at one end and said first support structure taper is inserted in said second support structure.

6. The lighting module of claim 5, wherein said first support structure taper in said second support structure hollow ends provides a compression force to join said first and second support structures.

7. The lighting module of claim 1, wherein at least one of said plurality of support structures has a square profile.

8. The lighting module of claim 7, wherein said support structure square profile is sized to fit over a light socket.

9. The lighting module of claim 7, wherein at least one of the ends of said overall support structure comprises an end cap to fit in a light socket.

10. The lighting module of claim 1, wherein said first and second light unit arrays are mounted on opposing surfaces of said support structure.

11. The lighting module of claim 1, arranged to operate within the Class 2 wiring guidelines of Class 2 circuits.

12. An illuminated sign, comprising:

a sign housing;

a plurality of lighting modules mounted in said sign box, at least one of said light modules comprising:

a plurality of support structures joined together to form an overall support structure of a desired length;

a plurality of light units, wherein at least some of said lighting units comprise a first light unit array on one of said support structure surfaces, and others of the said light units comprise a second light unit array on another one of said support structure surfaces; and wherein each of said first and second light unit arrays comprises first and second conductors running along said elongated support structure and arranged to connect said first light unit array in a series interconnection and to connect said second light unit array in a respective series interconnection, wherein the first of said conductors for said first lighting unit array is connected to the second of said conductors for said second lighting unit array, and wherein said second of said conductors for said first light unit array and the first of said conductors for said second light array are configured to be connected to a power supply or a second of said light modules.

13. The illuminated sign of claim 12, wherein said sign housing comprises a sign box.

14. The illuminated sign of claim 12, wherein said plurality of support structures are joined together end-to-end.

15. The illuminated sign of claim 12, wherein said overall support structure has a length of conventional elongated T8 fluorescent light sources.

16. The illuminated sign of claim 12, wherein said plurality of support structures comprises first and second support structures wherein said first support structure has an outer dimension and said second support structure is at least partially hollow and has an inner dimension, wherein said first support structure outer dimensions is slightly smaller than said second support structure inner dimension.

17. The illuminated sign of claim 12, wherein said plurality of support structures comprises first and second support structures, wherein said first support structure has a taper at one end and said second support structure is at least partially hollow at one end, wherein said first support structure taper fits in said second support structure hollow end.

18. The illuminated sign of claim 12, wherein said plurality of light modules are mounted in vertical orientation.

19. The illuminated sign of claim 12, wherein said plurality of light modules are mounted in horizontal orientation.

20. A lighting module, comprising:

a plurality of support structures attached to each other to form an overall support structure of a desired length, wherein said overall support structure has a plurality of surfaces;

a plurality of light units, wherein at least some of said lighting units comprise a first light unit array on one of said support structure surfaces, and others of the said light units comprise a second light unit array on another one of said support structure surfaces; and conductors arranged along said elongated support structure to connect said first and second light unit arrays in respective series interconnection, wherein only a single one of said conductors is shared by said first and second light unit arrays and conducts an electrical signal to both said first and second light unit arrays, and wherein each of said first and second light units arrays have a respective second conductor running along its one of said arrays, wherein said second conductor from said first light unit array is arranged to connect to a DC power supply and the second conductor in said second light unit array is arranged to be connected to ground.

* * * * *